Dec. 4, 1962 A. CLORFEINE 3,066,576
VARIABLE ATTENUATOR FOR SMALL WAVELENGTH RADIATION
Filed Oct. 16, 1959 2 Sheets-Sheet 1
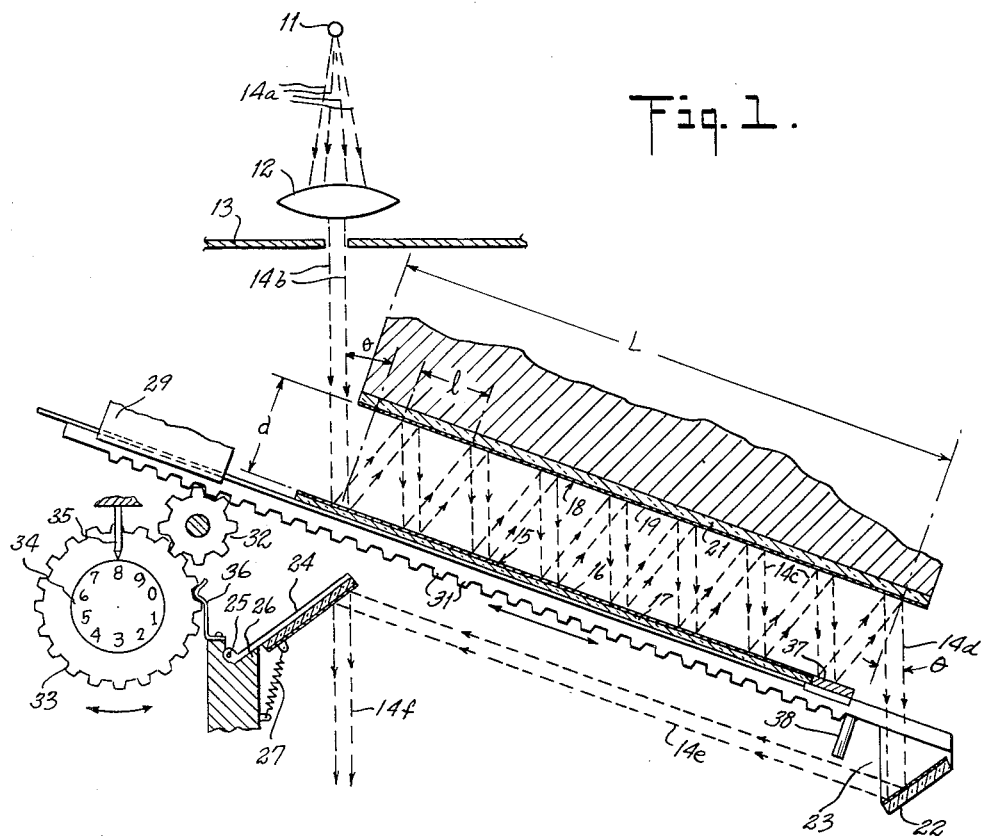
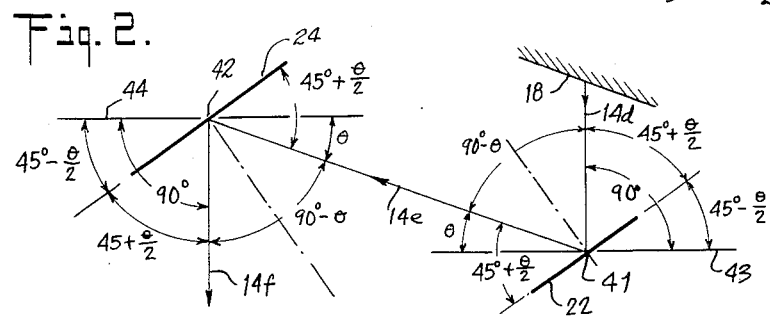
INVENTOR.
ALVIN CLORFEINE
BY Darby & Darby
ATTORNEYS

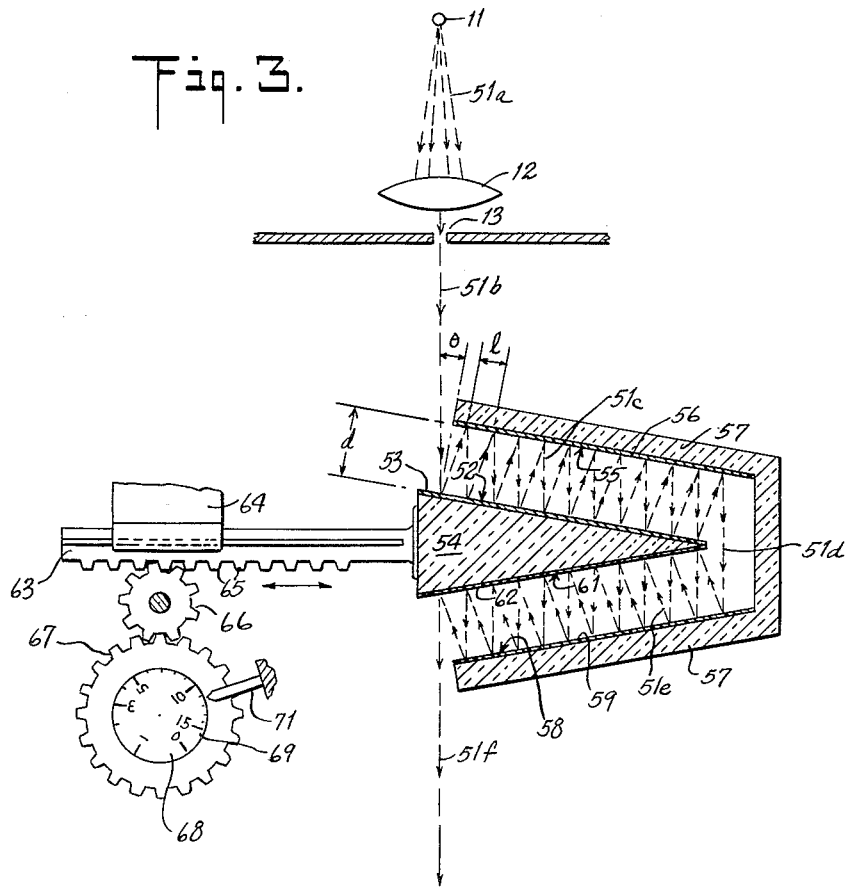

United States Patent Office 3,066,576
Patented Dec. 4, 1962

3,066,576
VARIABLE ATTENUATOR FOR SMALL
WAVELENGTH RADIATION
Alvin Clorfeine, Long Island City, N.Y., assignor to
Polarad Electronics Corporation, Long Island City,
N.Y., a corporation of New York
Filed Oct. 16, 1959, Ser. No. 846,855
7 Claims. (Cl. 88—61)

The present invention relates to attenuators for radiation of short wave length including visible light, infrared light, ultraviolet light and other radiation in portions of the electro-magnetic frequency spectrum near the previously mentioned portions.

More specifically the present invention relates to the attenuation of such radiation by a controlled amount by means of a particular number of reflections having a predetermined degree of attenuation associated with each reflection. The degree of attenuation may be substantially independent of wave length, within a particular frequency range thus minimizing or eliminating the necessity for special corrections or calibrations for different frequencies within a particular range.

Various expedients have been utilized for the attenuation of electro-magnetic energy of light frequency or near light frequency. Among these are semi-transparent filters which usually have a transmissivity which is highly dependent on frequency and the use of a pair of polarizing devices rotationally adjustable to vary light attenuation. The present invention, however, provides advantages over all known devices in that it provides a number of reflections which are precisely known and controllable and with at least a portion of these reflections there is associated a particular predetermined attenuation for each reflection. Thus the amount of attenuation is directly determinable from the known number of reflections.

In explaining the apparatus according to the present invention, it will be convenient, and perhaps necessary, to refer to the degree of attenuation of light in terms of "decibels." While the term "decibel" is more frequently used in reference to sound energy or radio frequency energy it is equally apt for light frequency energy since light and radio frequency energy are both electromagnetic radiations and fundamentally the same except for their frequency or wavelength.

The decibel is the most commonly used measure of power ratios in the communication art and is equal to one-tenth of a bel which is defined in Webster's New International Dictionary of the English Language, second edition, unabridged, 1958 as follows:

"A unit for logarithmic expression of ratios of power, and also ratios of voltage or current, in wire or radio communication. The number of bels is the common logarithm of a power ratio, and is twice the common logarithm of a current ratio. Thus 2 bels is a power ratio of 100 (since the logarithm of 100 is 2) and is a current ratio of 10 (since the logarithm of 10 is 1)."

The degree of attenuation may be made largely independent of the frequency of the radiation within a substantial range of frequencies, or alternatively, if precise measurement of attenuation is desired beyond the range of frequencies for which attenuation is substantially constant, then the apparatus may be suitably calibrated or otherwise corrected for variation of attenuation with frequency.

Apparatus according to the invention may readily be calibrated in simple integers corresponding directly to dbs. In typical apparatus according to the invention, any unitary number of pairs of reflections up to a certain maximum may be produced. If, for example, 100 pairs of reflections may be produced, each reflection may be caused to produce an attenuation of about 11% (one half db), each pair of reflections then producing an attenuation of about 20% (1 db). Such an apparatus may then be calibrated to produce from zero to 99.99999999% attenuation in predetermined steps of (1 db). The foregoing example is merely illustrative, and of course, any number of steps of practically any degree of attenuation may be provided.

In a preferred embodiment of the invention, the path of the radiation is arranged so that the output of the attenuator is co-linear with the input; this allows the apparatus to also be arranged so that incoming radiation passes directly through the apparatus without reflection and thus with zero db attenuation. This makes it possible for the attenuator to be inserted in a radiation path with effectively no (zero db) insertion loss, which provides a considerable practical advantage.

In addition to providing apparatus having the above described advantages it is an object of the present invention to provide an attenuator for electromagnetic radiation of the light and near light frequencies, which is variable to provide controlled degrees of attenuation over a substantial range of attenuation.

It is a further object of the present invention to provide such an attenuator in which the degree of attenuation is controllable in discrete steps.

It is a still further object of the present invention to provide such an attenuator in which the attenuation at such discrete steps bears a logarithmic relation so that the apparatus may be calibrated in logarithmic units, e.g. decibels.

It is a still further object of the present invention to provide an attenuator wherein the output is co-linear with the input and wherein the apparatus may be adjusted to provide no attenuation.

Other objects and advantages will be apparent from a consideration of the following description and explanation in conjunction with the appended drawings in which:

FIGURE 1 is a schematic representation of a variable attenuator according to the present invention together with a radiation source;

FIGURE 2 is a diagram illustrating the manner in which the reflecting elements are arranged to maintain co-linearity between the output and input radiation beams;

FIGURE 3 is an alternative form of apparatus utilizing two pairs of elongated reflecting surfaces.

Referring first to FIGURE 1, a radiation source is shown at 11 which emits radiation as indicated by rays 14a. A collimator lens 12 is provided to collimate the rays 14a to form a substantially nondivergent beam 14b. The size of the beam 14b is controlled by an aperture 13.

It will be understood that the radiation source, collimator, and aperture may be included within the apparatus, or the attenuation apparatus alternatively may be utilized to attenuate an external radiation source, in which case some or all of the preceding elements will be unnecessary.

The collimated beam 14b strikes a reflecting element 15 which is illustratively shown to comprise a base element 17 and a layer 16 deposited thereon. It will generally be preferred that the reflecting element 15 have a substantially uniform coefficient of reflectivity over its surface. In some cases it may be desired that the coefficient of reflectivity of the element 15 be substantially constant over a wide range of frequencies of the radiation for which the apparatus is designed. Depending upon the application for which the apparatus is to be used, it may be designed to be operable over the entire range of light and near light frequencies including infrared, visible light and ultraviolet light, or alternatively it may be designed for a limited portion of such range such as infrared light or may even be designed for a very limited frequency range such as the principal emission line of a particular element (sodium, for example).

In many cases the apparatus may be utilized over a wide range of frequencies without the necessity of correction for differing attenuations at different frequencies. However, in the event that such corrections are desired the apparatus may be calibrated to provide corrections to compensate for differing attenuations of the reflecting surfaces at different frequencies.

The reflecting surface of the reflecting element 15 may be provided by depositing a metallic layer on a glass base. Suitable metals for such a layer are gold, silver, chromium, and aluminum. Elements may be selected from the foregoing group or other elements may be selected which have a substantially constant reflectivity over a range of frequencies. The particular metal may be selected to conform to the particular range of frequencies for which the apparatus is to be used, and it may be taken into consideration whether a uniform or nonuniform attenuation with frequency is desired. In some instances it may be desired to substantially eliminate by sharp attenuation all frequencies other than a limited range with which one is concerned; in such a case, highly frequency sensitive reflecting surfaces may be utilized for the reflecting element 15.

Usually it will be desired to provide a predetermined amount of attenuation with each reflection from the reflecting element 15. For example, it may be desirable to provide about 11% (one half db) attenuation for a single reflection so that one pair of reflections provides about 20.57% (1 db) of attenuation. The amount of attenuation provided may be controlled by selection of material forming the layer 16.

Further control of the attenuation may be provided by forming the layer 16 sufficiently thin so that it is a partially reflecting mirror. In such a case it may be desirable to form the base 17 of a black radiation absorbing material or of a radiation transmissive non-reflective material.

Control of the attenuation for a single reflection from the reflecting element 15 may also be attained by forming the layer 16 of an alloy of various of the metals previously set forth, or of alloys of other materials. The use of alloys may also provide a more uniform reflectivity (and hence attenuation) over a range of frequencies than would be attained with a single material.

Although the reflecting element 15 has been described as formed of a layer 16 on a base 17 of glass for example, it should be appreciated that the reflecting element 15 may be a single piece of solid material such as aluminum or the like. In other cases, in order to protect the layer 16 from oxidation or other contamination it may be placed on the opposite side of the base 17 and the base 17 may be formed of a radiation transmissive material such as glass. In such a case it may be desirable to provide a non-reflective coating for the front face of the base material 17 so that reflection occurs chiefly from the reflecting layer on the back of the base 17.

Combinations of the previous expedients for forming the reflective element 15 may be utilized or any other suitable reflector may be utilized for the reflecting element 15.

A second reflecting element 18 is provided which is generally similar to reflecting element 15; however, the element 18 is not necessarily identical as it may have a reflecting surface of a different material than that of element 15 in order to provide more uniform overall attenuation with frequency. The reflecting element 18 is also illustratively shown as comprising a layer 19 formed on a base 21. The reflecting element 18 is fixed whereas the reflecting element 15 is movable.

The elements 15 and 18 are parallel so that the beam 14b is reflected back and forth therebetween as indicated by the rays 14c, and finally is projected out from between the parallel reflecting elements 15 and 18 at 14d. It will be apparent that the rays indicated at 14d are parallel to the rays 14b entering the pair of reflecting elements.

The number of reflections between the parallel elements 15 and 18 will be given by the expression $$n = \frac{L \cot \theta}{2d}$$

where L is the total length common to the mirrors measured parallel to their surfaces; $\theta$ is the angle of incidence of the radiation with respect to the normal to the reflecting element 15; $d$ is the distance between reflecting elements and $n$ is the number of pairs of reflections undergone by the ray.

If $\alpha$ is the attenuation in db due to a pair of reflections, then the total attenuation N due to the pair of reflecting elements 15 and 18 will be given by $$N = \frac{\alpha L \cot \theta}{2d}$$

From the foregoing it will be observed that the total attenuation N could be varied by varying any of the parameters, L, $d$ or $\theta$. In the apparatus of FIGURE 1 only the parameter L is varied by rendering the reflecting element 15 movable to vary the length of juxtaposed portions of the surfaces of reflecting elements 15 and 18.

The emerging rays 14d from between parallel reflecting elements 15 and 18 are reflected by a reflecting element 22 which is affixed to move with movable reflecting element 15 by means of a support 23. The reflecting element 22 is set at an angle of $$45° + \frac{\theta}{2}$$

with respect to the rays 14d so that the rays 14e reflected from reflecting element 22 are parallel to the surfaces of reflecting elements 15 and 18 as will later be explained with reference to FIG. 2.

A further reflecting element 24 is provided, oriented at an angle of $$45° + \frac{\theta}{2}$$

with respect to the surfaces of elements 15 and 18 (making the angle of incidence with respect to the normal of rays 14e, $$45° - \frac{\theta}{2})$$

The rays 14f reflected from reflecting elements 24 are accordingly parallel to the original rays 14b.

It will further be observed that if reflecting element 15 together with reflecting element 22 is moved in a direction parallel to the surface of reflecting element 15 through a distance $l$ there will be one less (or one more) pair of reflections from reflecting elements 15 and 18 but the emergent rays 14d will strike the reflecting element 22 at the same point so that rays 14e are the same distance from the reflecting element 15, and strike the reflecting element 24 at the same point as before. For this reason the structure may be formed to cause the emerging rays 14f to be not only parallel but also co-linear with the input rays 14b, as indicated in FIGURE 1.

The reflecting element 24 is normally stationary and is secured in place by a pivotal connection 25 together with a spring 27 which urges the reflecting member 24 against a stop 26.

Any suitable means may be utilized for transporting the reflecting member 15. For purposes of illustration the reflecting member 15 is shown restrained by guide members 29 for movement parallel to its surface and parallel to reflecting member 18.

A number of teeth 31 are provided upon reflecting member 15 which engage the teeth of a gear member 32. A further gear member 33 may be provided having a scale 34 which is calibrated to read the attenuation of the output directly in db. A cursor 35 is associated with the scale 34. It will be noted that as shown in FIGURE 1 the scale 34 is set at 8 and also as shown in FIGURE 1 that there are 8 pairs of reflections between the surfaces of reflecting elements 15 and 18. The apparatus of FIGURE 1 may conveniently be arranged so that each pair of reflections results in an attenuation of 20.57% (1 db) and so that the output is attenuated approximately 84% (8 db) as indicated on scale 34. Alternatively, each pair of reflections could provide an attenuation of 90% (10 db). The scale would then read directly in tens of dbs. Of course, any other calibration of the device may be provided which is convenient for the purpose to be served.

For purposes of illustration the maximum number of reflections of the apparatus of FIGURE 1 is shown to be ten pairs. However, it is apparent that from one to a hundred pairs of reflections or any other convenient number of reflections could be provided if desired.

From the previous explanation it will be observed that the attenuation of the radiation is variable in step-wise fashion and it may therefore be convenient to provide a detent 36 to assure that the dial 34 and thus the movable reflecting element 15 is centered on a particular discrete setting. This will also assure that the location of reflecting element 22 is proper to maintain the co-linearity of the output rays 14f with respect to the input rays 14b.

As it is impossible to provide a reflective surface having a 100% coefficient of reflection, there will be some attenuation due to reflecting elements 22 and 24. The effect of this attenuation may be compensated for by providing a compensating reflector 37 located to provide the last reflection from reflecting element 15. Compensating element 37 may be formed in such a way as to provide a reflectivity such that the total attenuation from compensating reflector element 37, the last reflection from reflecting element 18, the reflection from reflecting element 22 and the reflection from reflecting element 24, all taken together, is substantially equal the attenuation due to a pair of reflections between the surfaces of reflecting elements 15 and 18.

The selection of reflectivity coefficient of the various reflecting elements will depend upon the particular purpose to be served by the apparatus but may be explained by a simple example. If it is assumed that for a particular purpose an attenuation of 20.57% (1 db) per pair of reflections is to be provided, then the power of the beam after two reflections should be approximately 79.43% of that prior to reflection. This can be achieved by providing two reflectors of approximately 89% reflectivity coefficient each. This is readily possible since material such as gold, silver and others is available having reflectivity coefficients well over 90%.

If compensation for the attenuation due to reflection elements 24 and 22 is to be provided as in FIGURE 1, reflecting surfaces on elements 22, 24 and 37 may be provided, having a reflectivity coefficient of approximately 96%. The attenuation due to these three surfaces together with that due to the surface of reflection element 18 would then be approximately equal to 20.57% (1 db). If desired, a further compensating reflector element such as 37 may be utilized at the extreme left end of stationary element 18 so that the first reflection from element 18 as well as the last reflection from element 15 is from a compensating reflection element of higher reflectivity such as 37. With this arrangement each of the two elements 37 and reflector elements 22 and 24 may have an individual attenuation factor of approximately 6% (¼ db) as would be provided by a reflectivity of approximately 94%.

As it may be inconvenient to calibrate the apparatus in terms of percentage attenuation, the apparatus of FIGURES 1 and 3 are calibrated with integral numbers as indicated in the following table.

Table I

| Approx. attenuation in percent: | Calibration No. (approx. db.) |
|---|---|
| 0 | 0 |
| 20.57 | 1 |
| 36.9 | 2 |
| 49.88 | 3 |
| 60.19 | 4 |
| 68.38 | 5 |
| 74.88 | 6 |
| 80.05 | 7 |
| 84.15 | 8 |
| 87.41 | 9 |
| 90.00 | 10 |
| 96.84 | 15 |

It will be noted in the particular example above that the calibration numbers correspond to the attenuation value in decibels. Such calibration will be particularly useful in some applications of the device.

It is desired in the arrangement of FIGURE 1 that an output be available from the attenuator which is substantially unattenuated for a particular adjustment of the attenuator. It will be observed that the movable reflector element 15 is adjustable so that it may be moved to the left in FIGURE 1 until it no longer is in the path of incoming rays 14b. A projection 38 is provided on the end of the reflector element 15 which engages the reflector element 24 when element 15 is moved to its extreme leftward position. The reflector element 24 is thus pivoted about member 25 so that it is also removed from the path of incoming rays 14b which then pass directly through the apparatus without reflection and consequently without significant attenuation.

It will generally be desirable to provide a housing for the apparatus shown in FIGURE 1 which has, however, been omitted for the sake of simplicity. If precise measurements are to be made at wave lengths where atmospheric absorption would be an appreciable factor, the housing for the attenuator may be evacuated or alternatively, compensation may be made for the attenuation due to atmospheric absorption. For certain reflective surfaces it may alternatively be desirable to fill the apparatus housing with an inert gas to prevent oxidation or other contamination of reflective surfaces. Filling with a dry inert gas would also eliminate any difficulty due to condensation of water vapor on the reflecting surfaces.

The manner in which reflecting elements 22 and 24 are arranged to provide parallel and co-linear relation between the input and output beams may be seen from FIGURE 2 which shows the ray 14d from reflecting element 18 striking the reflecting element 22 at point 41 from which it is reflected as ray 14e to point 42 on reflecting element 24, and is further reflected as output ray 14f. Lines 43 and 44 are reference lines indicating the plane normal to the input ray 14b and of course also normal to ray 14d which is parallel thereto.

As shown in FIGURE 2 the angle between ray 14d and the surface of reflecting element 22 is $$45° + \frac{\theta}{2}$$

The angle between the plane of reflecting element 22 and the reference line 43 is $$45° - \frac{\theta}{2}$$

The angle between reflected ray 14e and the surface of reflecting element 22 is $$45° + \frac{\theta}{2}$$

so that the angle between ray 14e and a plane normal to ray 14d as shown at 43 is θ. Since θ is also the angle between the surface of reflecting elements 15 and 18 and the plane normal to the input ray 14b and also ray 14d, then it follows that ray 14e is parallel to the plane of reflecting element 15 and therefore is not displaced laterally by a movement of reflecting element 22 by an amount equal to l in a direction parallel to the plane of reflecting element 15. Thus, for a series of positions separated by respective distances l, the rays 14e are spaced from the element 15 by a distance such that when reflected from reflecting element 24 they are colinear with the incoming rays 14b, as indicated at 14f in FIGURES 1 and 2. Obviously ray 14f is parallel to ray 14d (and hence 14b) since mirrors 22 and 24 by which the rays are reflected are parallel.

An alternative form of the invention is shown in FIGURE 3 wherein two pair of elongated parallel reflecting elements are provided rather than a single pair as in FIGURE 1.

In FIGURE 3 a radiation source is indicated at 11 emitting radiation indicated by rays 51a. The rays 51a may be colliminated by a collimator lens as indicated at 12. An aperture 13 may be provided for controlling the size of the beam indicated by rays 51b. The rays 51b strike a reflecting element 52 which may be formed of a layer 53 on a base structure 54. The reflecting element 52 may be any one of the forms described in the explanation of FIGURE 1.

The reflected ray from reflecting element 52 is subsequently reflected from a second parallel reflecting element 55 which is also shown as comprising a layer 56 on a base structure 57. The reflecting element 55 may be generally similar to reflecting element 52 or may be formed of different material to provide a better uniformity of attenuation over a given frequency range.

Although it is generally assumed that in most applications uniform attenuations over a frequency range would be desired, it is obvious that in special situations a nonuniform attenuation with frequency may be desirable such as to compensate for the non-linear frequency characteristic of another device in a particular system. The use of different types of reflecting materials may be useful in arriving at a particularly desired nonuniform attenuation-frequency characteristic also.

A series of reflections is imparted to the ray 51c by the reflecting elements 52 and 55 in a manner generally similar to that explained with reference to FIGURE 1. When the ray 51c reaches the end of the reflecting element 52 through a series of reflections it passes past the end of reflecting element 52 and strikes another reflecting element 58 which is shown as comprising a layer 59 on the same base structure 57 which formed a part of reflecting element 55. It will be understood that the base structure 57 is shown as a unitary element in FIGURE 3 for simplicity but that in practice it may be assembled from a number of structural parts.

The rays indicated at 51e are reflected between the reflecting element 58 and a further reflecting element 61 formed of a layer 62 affixed to the base structure 54. Base structure 54 has been shown for convenience as a single unitary wedge shaped member but may, of course, be assembled of a number of parts if convenient.

It will be observed that the apparatus of FIGURE 3 differs from that of FIGURE 1 in that when the ray indicated at 51d is projected from the first pair of parallel reflecting elements 52 and 55, it is again reflected an equal number of times between reflecting elements 61 and 58 before being projected as an output beam 51f.

Although it will generally be preferred that the structure of FIGURE 3 be formed in a symmetrical fashion so that the angles and spacings of the first pair of reflecting elements 52 and 55 is the same as the second pair of reflecting elements 58 and 61; these spacings and angles need not be the same and may differ in the case of the two pair of reflecting elements if desired.

The apparatus of FIGURE 3 also differs from that of FIGURE 1 in that the reflecting elements 52 and 61 are movable in a direction other than parallel with their surfaces. The elements 52 and 61 are connected to a rack 63 which is constrained to move in a direction lying along the bisector of the angle subtended by the surfaces of reflecting elements 52 and 61. Although the movement could be in another direction this mode of movement preserves the symmetry of the apparatus and assures the colinearity of the input ray 51b with the output ray 51f.

Rack 63 is provided with teeth 65 which engage the teeth of a gear 66. Gear 66 is driven by a further gear 67 to which is attached a dial 68 which is calibrated with indicia 69 and is provided with a cursor 71.

The apparatus of FIGURE 3 will be seen to be somewhat simpler than that of FIGURE 1 in that the pivotable mirror 24 is eliminated and the ray 51b passes through the device without attenuation without the necessity for providing additional movable parts other than the reflecting elements 52 and 61.

The apparatus of FIGURE 3 also differs in that in the form shown a minimum of four reflections rather than two reflections is required and each discrete value of attenuation is separated from an adjacent one by the attenuation due to four reflections. As the four reflecting surfaces may be of different materials and otherwise arranged to have different attenuation and different attenuation versus frequency characteristics, a particularly desired attenuation versus frequency characteristic may be obtained with a high degree of accuracy.

A still further difference in the apparatus of FIGURE 3 resides in the fact that the variation in attenuation is not linear with respect to motion of the movable reflecting elements 52 and 61, but rather the apparatus has in effect a compressed scale. In other words, the motion required for a unit difference in attenuation at a low value of attenuation is greater than that required for a unit difference in attenuation at a high value of attenuation. The non-linearity of the device of FIGURE 3 will be apparent when it is considered that movement of reflecting elements 52 and 61 changes not only the effective length of the reflecting surfaces, corresponding to L in FIGURE 1, but also the distance between reflecting surfaces is simultaneously reduced to provide a change in attenuation in the same sense. The distance between surfaces corresponds to the parameter d discussed in connection with FIGURE 1.

In view of the non-linearity characteristic of the device of FIGURE 3, the scale 68 will be calibrated accordingly and if detents are provided they will also be arranged non-linearly to correspond to the characteristic of the apparatus.

The calibration numbers in the apparatus of FIGURE 1 may represent attenuation as previously shown in Table I or any other convenient calibration may be adopted.

From the previous explanation it will be appreciated that considerable variation is possible in the particular form of the path which the light rays take through the attenuator. In addition to those previously described it will be appreciated that the light ray may be caused to transverse back and forth several times along the same pair of reflecting surfaces rather than traversing the pair of surfaces only once, as shown.

Furthermore, while the apparatus described has been arranged to provide attenuation principally in the reflection process, semi-transmissive coatings could be provided for the reflecting surfaces to provide attenuation or to alter the attenuation characteristic of the device; furthermore, the semi-transmissive medium need not be applied as a coating directly to the reflective surface but may otherwise be placed in the light path.

In addition to the variations and modifications to the apparatus described, numerous other variations and modifications will be apparent to those skilled in the art and the scope of the invention is accordingly not to be construed to be limited to the particular arrangements shown, described or suggested, but is rather to be limited solely by the appended claims.

What is claimed is:

1. A variable attenuator for short wavelength radiation comprising a plurality of radiation reflectors arranged to reflect rays of substantially collimated radiation through a predetermined path wherein the terminal portion of said path is colinear with the initial portion, a mounting rendering at least one of said reflectors movable, means for moving at least one of said reflectors to a plurality of different positions wherein said reflectors are arranged to reflect rays of radiation through a predetermined path wherein the terminal portion of said path is colinear with the initial portion, each of said positions providing a different number of reflections between said initial portion and said terminal portion, and means for indicating the position and thus the number of reflections and the attenuation imparted by said attenuator, whereby an output radiation beam may be provided which is colinear with an input radiation beam and the attenuation of said beam may be varied in a number of discrete steps.

2. A variable attenuator for short wavelength electromagnetic radiation comprising at least one pair of reflecting elements for reflecting said radiation with a measurable amount of attenuation, each element of said pair being parallel to and facing the other whereby a ray of said radiation may be successively reflected back and forth between said reflecting elements, means for movably mounting one of each pair of said reflecting elements, means for moving each said movably mounted reflecting element with respect to the respective other one of said reflecting elements with at least a component of movement in a direction perpendicular to the plane of the respective pair of elements to change the number of reflections experienced by rays directed in a predetermined direction into the space between said reflecting elements before being projected out from between said elements thereby causing a change in attenuation of determinable amount due to the reflections, and means for indicating the amount of the movement to thereby provide a measure of the attenuation of radiation directed through said attenuator.

3. A variable attenuator for short wavelength electromagnetic radiation comprising a pair of reflecting elements for reflecting said radiation with a measurable amount of attenuation, each element of said pair being parallel to and facing the other whereby a ray of said radiation may be successively reflected back and forth between said reflecting elements, means for movably mounting one of said reflecting elements, means for moving said movably mounted reflecting element with respect to another of said reflecting elements with at least one component of movement in a direction parallel to the plane of said elements to change the number of reflections experienced by rays directed in a predetermined direction into the space between said reflecting elements before being projected out from between said elements thereby causing a change in attenuation of determinable amount due to the reflections, and means for indicating the amount of the movement to thereby provide a measure of the attenuation of radiation directed through said attenuator.

4. A variable attenuator for short wavelength electromagnetic radiation comprising a pair of reflecting elements for reflecting said radiation with a measurable amount of attenuation, each element of said pair being parallel to and facing the other whereby a ray of said radiation may be successively reflected back and forth between said reflecting elements, means for movably mounting one of said reflecting elements, means for moving said movably mounted reflecting element in a direction parallel with respect to the surface of the other of said reflecting elements to change the number of reflections experienced by rays directed in a predetermined direction into the space between said reflecting elements before being projected out from between said elements thereby causing a change in attenuation of determinable amount due to the reflections, and means for indicating the amount of the movement to thereby provide a measure of the attenuation of radiation directed through said attenuator.

5. A variable attenuator for short wavelength electromagnetic radiation comprising a pair of reflecting elements for reflecting said radiation with a measurable amount of attenuation, each element of said pair being parallel to and facing the other whereby a ray of said radiation may be successively reflected back and forth between said reflecting elements, means for movably mounting one of said reflecting elements, means for moving said movably mounted reflecting element to change the number of reflections experienced by rays directed in a predetermined direction into the space between said reflecting elements before being projected out from between said elements thereby causing a change in attenuation of determinable amount due to the reflections, a second pair of parallel low attenuation reflecting elements, one of said second pair of elements being disposed to reflect a beam projected out from between said first pair of elements in a direction parallel to the planes of said first pair of elements, said one of said second pair of elements being arranged to move with said movably mounted reflecting element, the other of said second pair of elements being disposed to reflect the beam from said one of said pair of elements along a line substantially colinear with the input to said attenuator, and means for indicating the amount of the movement to thereby provide a measure of the attenuation of radiation directed through said attenuator.

6. Apparatus as claimed in claim 5 further including a reflecting surface portion on one of said pair of reflecting elements having a higher reflectivity than the remainder of said element to compensate for the attenuation due to said second pair of reflecting elements.

7. A variable attenuator as claimed in claim 1 further including means for moving at least one of said reflectors to allow said rays to pass through said attenuator without reflection and without significant attenuation.

References Cited in the file of this patent

UNITED STATES PATENTS

| | | |
|---|---|---|
| 1,789,521 | Feingold | Jan. 20, 1931 |
| 1,848,874 | Fitz Gerald | Mar. 8, 1932 |
| 2,232,177 | Ide | Feb. 18, 1941 |
| 2,881,663 | Dearborn | Apr. 14, 1959 |

FOREIGN PATENTS

| | | |
|---|---|---|
| 732,360 | Great Britain | June 22, 1955 |